US006457833B1

(12) United States Patent
Ishikawa et al.

(10) Patent No.: US 6,457,833 B1
(45) Date of Patent: Oct. 1, 2002

(54) DIGITAL MICRO MIRROR DEVICE AND SINGLE-PANEL COLOR PROJECTOR USING IT

(75) Inventors: Yoshimoto Ishikawa, Yamato; Akinori Kaneko, Fujisawa, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/517,754

(22) Filed: Mar. 3, 2000

(30) Foreign Application Priority Data

May 24, 1999 (JP) .......................... 11-143194

(51) Int. Cl.[7] .................. G03B 21/28; G02F 1/31
(52) U.S. Cl. .................. 353/99; 353/31; 348/743; 348/771; 359/292
(58) Field of Search ................. 353/31, 34, 37, 353/98, 99; 348/742, 743, 745, 750, 755, 770, 771; 345/108; 359/290, 292, 318, 846, 849

(56) References Cited

U.S. PATENT DOCUMENTS 5,357,288 A * 10/1994 Hiroshima et al. ......... 348/742
5,369,433 A * 11/1994 Baldwin et al. ............ 348/771
5,410,370 A    4/1995 Janssen
5,471,584 A * 11/1995 Blaxtan et al. ............. 345/108
5,528,318 A    6/1996 Janssen
5,650,832 A *  7/1997 Poradish et al. ........... 348/743
5,921,650 A *  7/1999 Doany et al. ............... 353/31
6,256,073 B1 * 7/2001 Pettit .......................... 348/743

FOREIGN PATENT DOCUMENTS

JP             8-5940           1/1996

* cited by examiner

Primary Examiner—William Dowling
(74) Attorney, Agent, or Firm—Marian Underweiser, Esq.; McGinn & Gibb, PLLC

(57) ABSTRACT

A digital micro mirror device (and a single-panel color projector using a digital micro mirror device) includes a reflection surface including an array of micro mirrors. The reflection surface is divided into two or more areas, and the axis direction about which a mirror of the array of micro mirrors rotates in one area is the same for all of the micro mirrors in the area. The single-panel color projector includes a white light source, a color separator for separating a white light from the white light source into two or more light beams, the digital micro mirror device reflecting the two or more light beams, an illumination light establishing unit for illuminating the two or more light beams from the color separator, and a projection unit for collecting and projecting light reflected from the digital micro mirror device.

16 Claims, 5 Drawing Sheets

DIGITAL MICRO MIRROR DEVICE AND SINGLE-PANEL COLOR PROJECTOR USING IT

BACKGROUND OF THE INVENTION

1. Field of the Invention

The present invention generally relates to a digital micro mirror device (DMD) and a single-panel color projector using the digital micro mirror device.

2. Description of the Related Art

In the field of color projectors, a projector that displays a brighter large-screen image is desirable. An example of such a projector is a conventional three-panel projector using three light valves including liquid crystal panels. This projector has been popular because it is easy to install, has good portability, and has high intensity. However, the cost of light valves is high, and thus the cost of a device (e.g., the projector) using three light valves has been very high. Further, the optical system is also complicated, and thus the device is oversized.

Alternatively, in a color sequential display method, one light valve having a high response speed is used and light in the three primary colors is successively projected at high speed by a rotating color disk or the like. In this approach, a field image of each color is successfully displayed providing a seemingly full-color frame display to the viewer. This method allows for a device that is small, lightweight and inexpensive because only one light valve is used and the optical system is simple.

The liquid crystal panel, of a transparent or reflective type, used in a three-panel liquid crystal projector is not capable of a response speed high enough for use in the color sequential display method. Therefore, in the color sequential display method, a light valve, such as a digital micro mirror device (DMD) or reflective-type ferroelectric liquid crystal panel formed on crystalline silicon, is used. Since these are binary-type devices (e.g., having only the two states of ON/OFF), grayscales are achieved by controlling the ON/OFF duty with a Pulse Width Modulation (PWM) control, for example. However, PWM has low intensity since ⅔ of white light from a light source is lost when using a color disk.

In the color sequential display method using one light valve, if two or all three primary colors separated from white light can be effectively used, a high-intensity and inexpensive projector can be provided.

U.S. Pat. No. 5,410,370 and U.S. Pat. No. 5,528,318 describe color sequential display methods using a rotating prism. The prism separates a white light source into color bands of red, green and blue and moves the color bands, to scan a light valve. Since a liquid crystal panel used for a three-panel liquid crystal projector is incapable of a response speed necessary for a color successive display method, a light valve such as a DMD or reflective-type ferroelectric liquid crystal panel formed on crystalline silicon should be used, and the assignment of intensity levels should be implemented by PWM.

However, because of the necessity of separating the color bands, this method makes the width of the bands narrower and a time to illuminate the light valve with the color bands shorter. Therefore, it is impossible to acquire sufficient grayscales using PWM. In addition, a very complicated control of PWM is necessary since a passing speed of the color bands changes in a non-linear manner because rotation of the prism and the timing for switching colors of the color band is different for each pixel line.

A high-intensity single-panel projector is possible by replacing a rotating color disk with a double rotating dichroic mirror disk, thereby separating a white light beam from the white light source into three light beams. The three light beams, each of which is changing color in the order of green-blue-red, red-green-blue, blue-red-green, and each light beam incident to a third of the area of a light valve, such as one DMD, effectively use all the light separated into the three primary colors. Since this method has the same illumination time as a conventional single panel method, sufficient grayscales are acquired by PWM, and colors of incident light change simultaneously. Thus, control of PWM becomes easier.

However, this method causes a phenomenon in which the three light beams overlap adjacent areas, and a problem arises in that the overlap area does not display the desired color. Further, if a black mask or the like is placed among the three areas in order to prevent overlapping, the three areas cannot be displayed continuously as one image.

SUMMARY OF THE INVENTION

In view of the foregoing and other problems, disadvantages, and drawbacks of the conventional digital micro mirror devices, the present invention has been devised, and it is, therefore, an object of the present invention to provide a digital micro mirror device where at least two of the three primary colors can be effectively used by illuminating a light beam separated into the three primary colors to a third of an area of a light valve and reflecting it therefrom.

Further, it is an object of the present invention that even light beams overlapping adjacent areas will not adversely affect a projected image.

It is a further object of the invention to provide, in a color sequential display, using one digital micro mirror device, a single-panel color projector that makes at least two of the three primary colors obtained from white light to be used effectively, thereby providing a low-cost device having high intensity and which securely displays colors and controls a PWM for displaying grayscales.

In a first aspect of the present invention, a digital micro mirror device includes an array of micro mirrors on a reflection surface, the reflection surface being divided into two or more areas, the direction of an axis about which each mirror rotates being different in an adjacent area and two or more light beams being illuminated to the corresponding areas respectively and reflecting them therefrom.

In a second aspect of the present invention, a single-panel color projector includes a white light source, a color separator for separating a white light from the white light source into two or more light beams so that the three primary light colors appear successively and the same color does not appear at the same time as another, a digital micro mirror device having an array of micro mirrors on its reflection surface, the reflection surface being divided into two or more areas, and a direction in which a mirror rotates on an axis being different in adjacent areas among the two or more areas, and two or more beams being illuminated into the corresponding areas respectively and being reflected therefrom, an illumination light illuminating each light beam from the color separator so that the incident light corresponds to a rotating axis direction of each area thereof, and a projector for collecting the light reflected in the predetermined direction from the digital micro mirror device, the projector for projecting the collected light.

With the unique and unobvious aspects of the present invention, two or all three primary colors can be separated from white light and effectively used by illuminating each light beam into different areas and reflecting it therefrom, without illumination light from overlapping adjacent areas adversely affecting a projected image.

The present disclosure relates to subject matter contained in Japanese Patent Application 11-143194, filed May 24, 1999, which is expressly incorporated herein by reference in its entirety.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
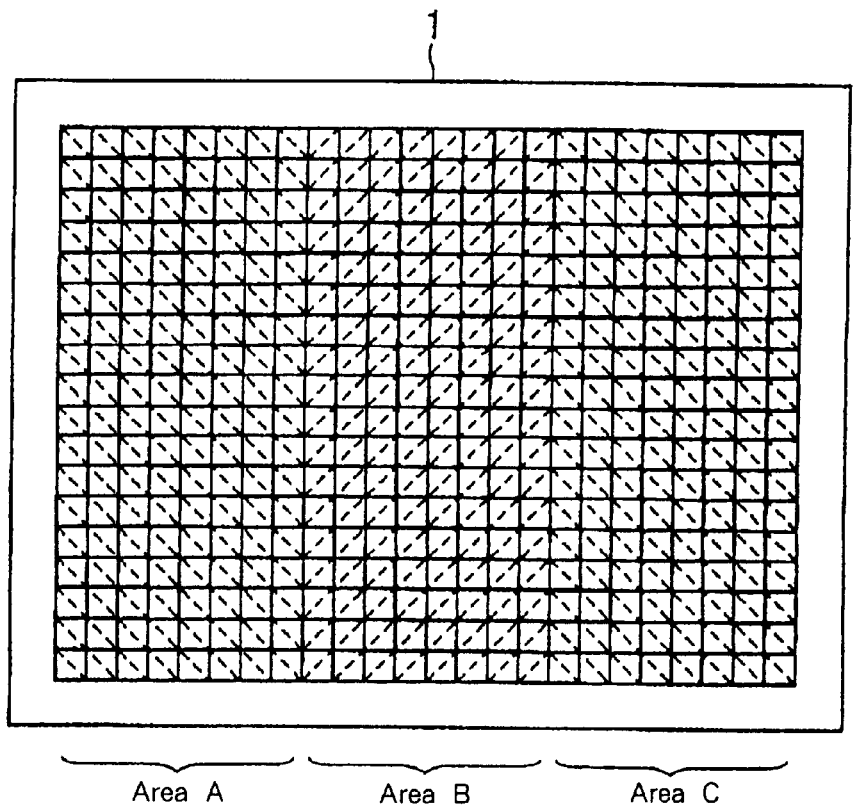
FIG. 1 schematically illustrates a configuration of a digital micro mirror device (DMD) according to a preferred embodiment of the present invention.

Referring now to the drawings, and more particularly to FIGS. 1–5, a preferred embodiment of the present invention is described.

FIG. 1 illustrates a digital micro mirror device (DMD) 1 including a mirror portion divided into three areas (e.g., area A (left), area B (center) and area C (right)). The hinge rotating direction of the micro mirrors around a hinge in areas A and C is orthogonal to the rotation direction of the micro mirrors around a hinge in area B. For instance, if the hinged micro mirrors in areas A and C rotate around a diagonal line connecting upper left and lower right, the hinged micro mirrors in area B rotate around a diagonal line connecting lower left and upper right.

Each micro mirror part of the DMD 1 has a known configuration of a square mirror system placed on a static random access memory (SRAM). A hinge direction in a certain area can be changed merely by changing an electrode position of the SRAM, thereby to mount the mirror system rotated by 90 degrees from a usual position.

Figure 2:
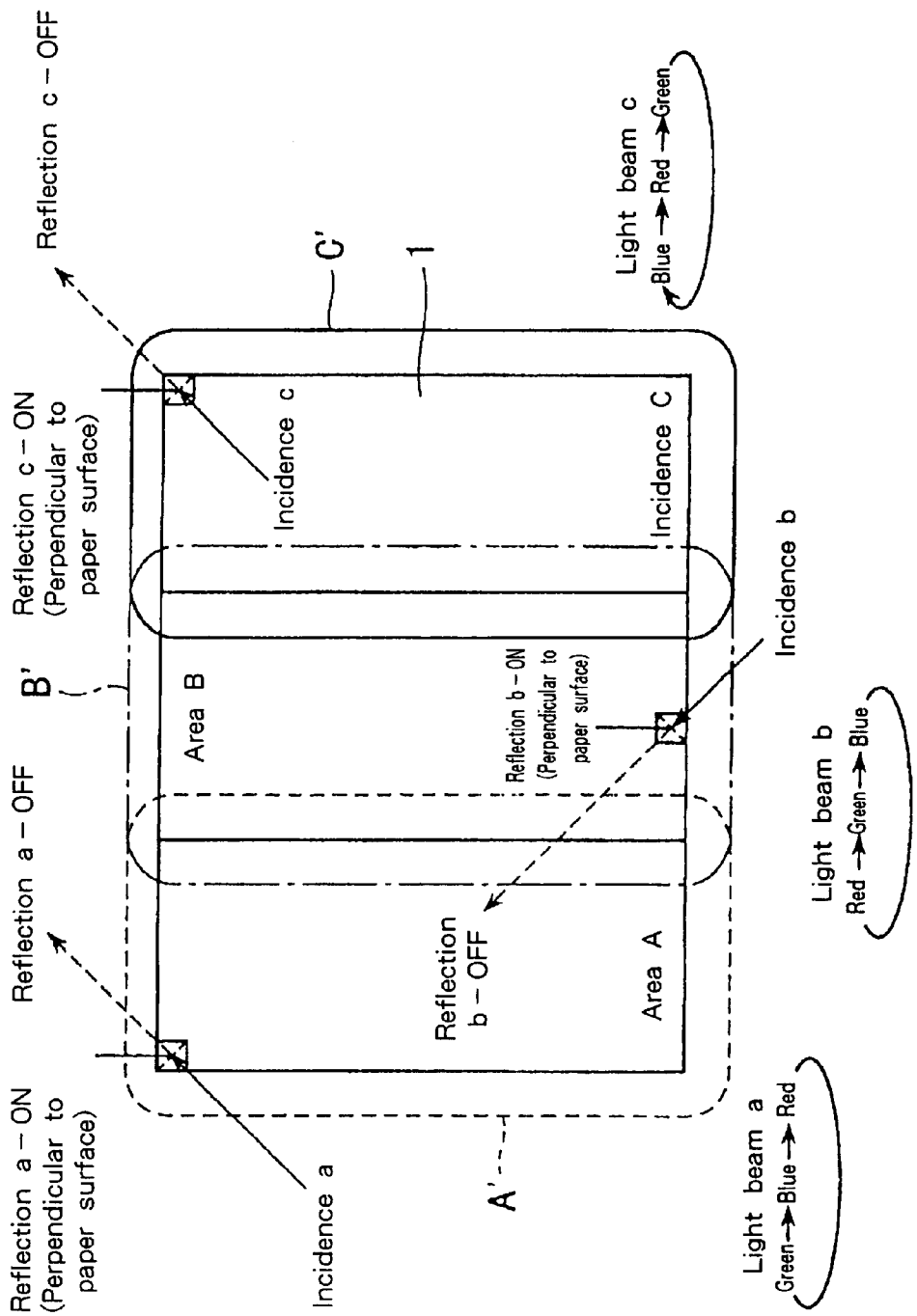
FIG. 2 illustrates the operating principles of a color sequential display using the DMD according to the preferred embodiment of FIG. 1.

FIG. 2 is a diagram for explaining the operating principles of a color sequential display using the DMD 1. A light from a white light source is separated into three light beams a, b, c by a color separator including two rotating dichroic mirrors, and light beam a changes color in an order of green-blue-red-green along with a rotation of a rotating dichroic mirror, light beam b changes color in the order of red-green-blue-red along with a rotation of a rotating dichroic mirror, and light beam c changes color in the order of blue-red-green-blue along with a rotation of a rotating dichroic mirror.

Light beam a incident upon an area A of the DMD 1 is irradiated from the lower left front in the drawing to range A' (e.g., illustrated as a broken line) to cover area A. When a micro mirror in area A inclines in a direction to lift its upper right side, incident light a is reflected perpendicular (e.g., to the drawing surface) by the micro mirror and enters a projection lens, so that a pixel is displayed on the screen. In this case, it becomes reflection a-ON. Conversely, when the micro mirror inclines in a direction lifting its lower left side, incident light aa is reflected by the micro mirror in a direction not entering into the projection lens so that no pixel is displayed. In this case, it becomes reflection a-OFF.

Light beam c incident upon area C of the DMD 1 is irradiated from the lower left front in the drawing to range C' (e.g., illustrated as a solid line) to cover area C. When a micro mirror in area C inclines in a direction to lift its upper right side, incident light cc is reflected perpendicular to the paper surface by the micro mirror and enters a projection lens so that a pixel is displayed on the screen. Namely, it becomes reflection c-ON.

Conversely, when the micro mirror inclines in a direction lifting its lower left side, incident light c is reflected by the micro mirror in a direction not entering the projection lens so that no pixel is displayed. In this case, it becomes reflection c-OFF.

Light beam b incident upon area B of the DMD 1 is irradiated from the lower right front in the drawing to range B' (illustrated by an alternate long and short dashed line) to cover area B. When a micro mirror in area B inclines in a direction to lift its upper left side, incident light bb is reflected perpendicular to the paper surface by the micro mirror and enters a projection lens, and a pixel is displayed on the screen. In this case, it becomes reflection b-ON.

Conversely, when the micro mirror inclines in a direction to lift its lower right side, incident light b is reflected by the micro mirror in a direction such that the light b does not enter the projection lens so that no pixel is displayed. In this case, it becomes reflection b-OFF.

The ON/OFF position of each micro mirror in area A, B and C is controlled so that a color field corresponding to a displayed image is displayed according to the changing colors of light beams a, b and c. Thus, a full-color image is projected on the screen.

Figure 3:
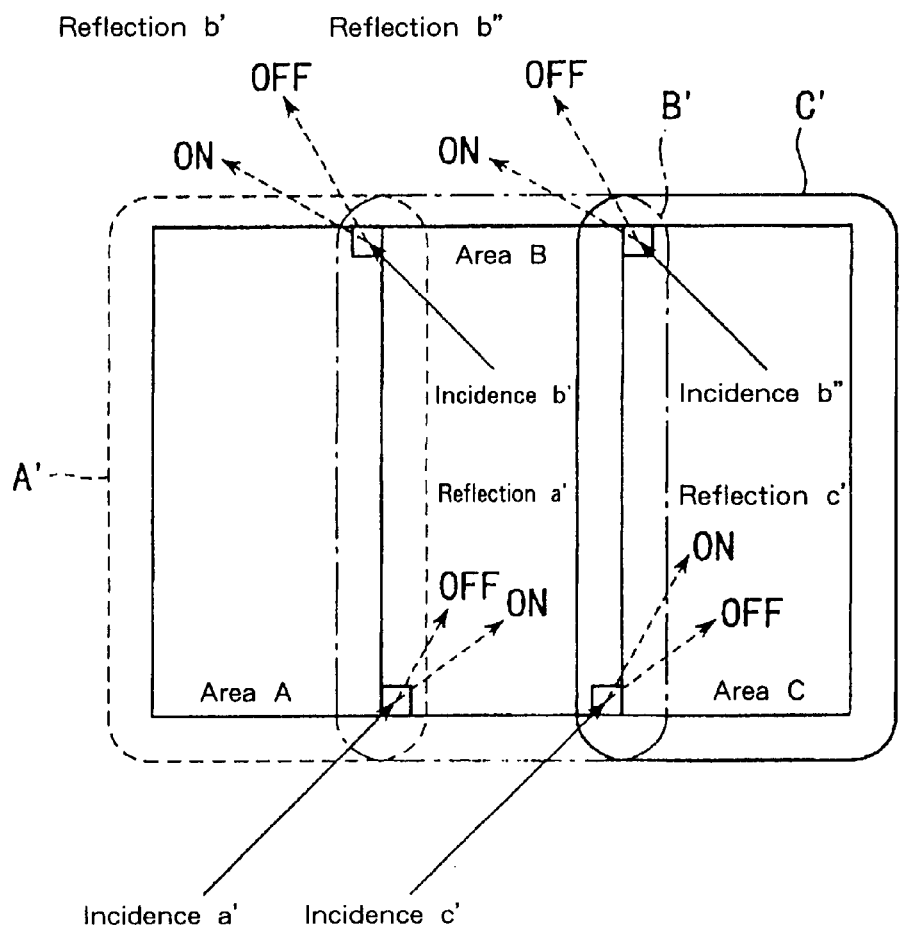
FIG. 3 illustrates an operation which prevents an overlapping effect of illumination light beams in adjacent areas on the DMD according to the preferred embodiment.

FIG. 3 is a diagram for explaining that light beams overlapping adjacent areas on DMD 1 are not directed towards a projection lens, and where light beam a is irradiated from the lower left front side so it covers area A. Thus, illumination light a' of the overlapping portion also enters into a micro mirror in area B. However, since the micro mirror in area B inclines in a direction lifting its upper left side in an ON state and inclines in a direction lifting its lower right side in an OFF state, reflected light a' is not reflected perpendicular to the paper surface regardless of the micro mirror being ON or OFF. Thus, reflected light a' is not projected onto the screen through a projection lens.

Likewise, light beam c is irradiated from a lower left front side so it covers area C and thus illumination light c' of the overlapping portion also enters a micro mirror portion in area B. However, since a micro mirror in area B inclines in a direction lifting its upper left side in an ON state and inclines in a direction lifting its lower right side in an OFF state, reflected light c' is not reflected perpendicular to a paper surface regardless of the micro mirror being ON or OFF. Thus, reflected light c' is not projected onto the screen through a projection lens.

Furthermore, light beam b is irradiated from a lower right front side so it covers area B and thus entering light b', b" of the overlapping portion also enters onto micro mirrors in areas A, C. However, since the micro mirrors in areas A, C incline in a direction lifting their upper right sides in an ON state and incline in a direction lifting their lower left sides in an OFF state, reflected light b', b" are not reflected perpendicular to the paper surface regardless of the micro mirrors being ON or OFF. Thus, reflected light b', b" are not projected onto the screen through a projection lens.

Figure 4:
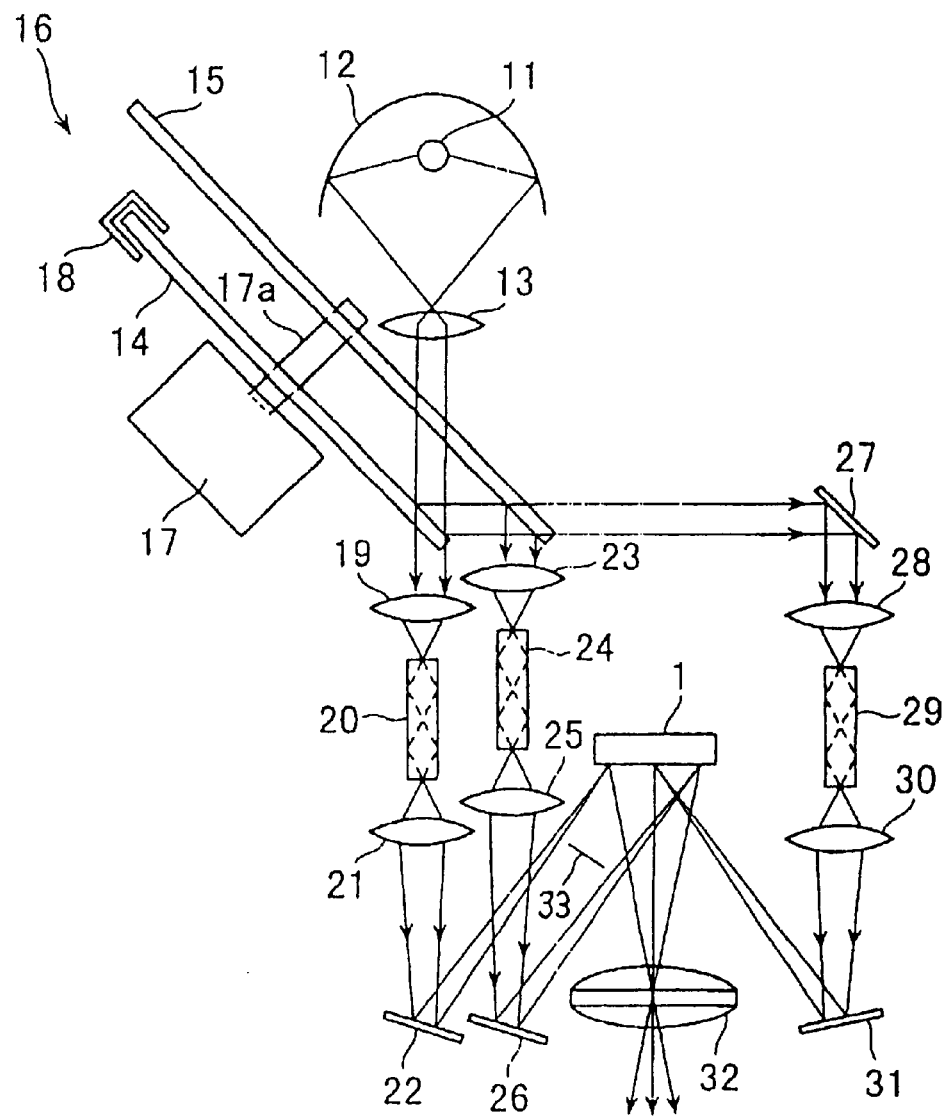
FIG. 4 illustrates a configuration of an entire projector according to the preferred embodiment.

FIG. 4 shows a configuration of an entire projector, wherein a white light source 11 such as a metal halide lamp is placed on the first focus of an oval reflection mirror 12, and a collimator lens 13 is placed in a rearward direction of the second focus so that the focus of that collimator lens 13 matches a second focus. Thus, the light diverging from the white light source 11 is converted into an almost parallel white light beam of which the diameter is narrowed by the collimator lens 13.

A rotating dichroic mirror disk system 16 is used as a color separator combining two (e.g., first and second) dichroic mirror disks 14, 15 inclined at substantially 45 degrees to the white light beam from the collimator lens 13. The rotating dichroic mirror disk system 16 is equipped with a spindle motor 17. The dichroic mirror disks 14, 15 are fixed on an axis 17a of the spindle motor 17, with the mirror disk 14 located inside and the mirror disk 15 located outside with a predetermined spacing therebetween.

Figure 5:
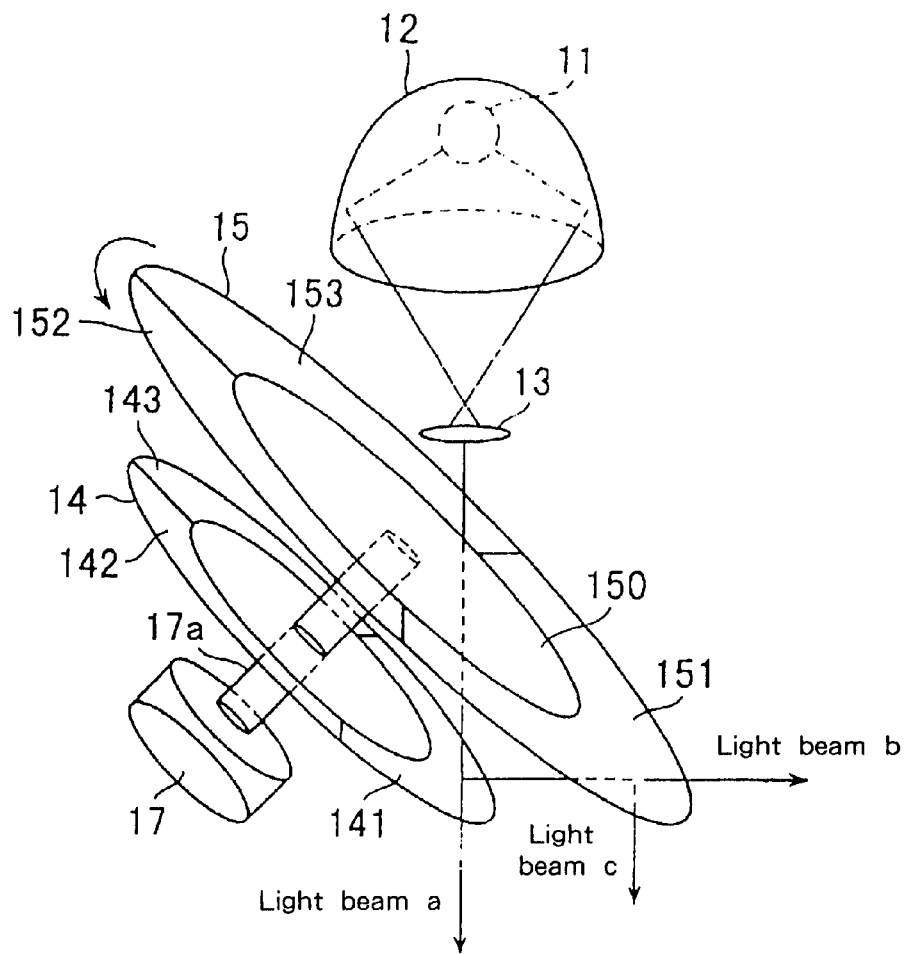
FIG. 5 illustrates a configuration and functions of a dichroic mirror disk of a rotating dichroic mirror disk system according to the preferred embodiment.

The first dichroic mirror disk 14, as shown in FIG. 5, is preferably a disk having a small diameter made by combining three fan-shaped dichroic mirrors 141, 142 and 143 having a vertical angle of substantially 120 degrees. Each of the mirrors 141, 142 and 143 selectively transmits one of the three primary colors (e.g., green, blue or red light) and reflects any other light.

The second dichroic mirror disk 15 has a transparent area 150 substantially in the middle thereof, and preferably is a disk having a large diameter formed by combining at an outer perimeter three fan-shaped dichroic mirrors 151, 152 and 153 and having a vertical angle of 120 degrees. Each of the mirrors 151, 152 and 153 selectively transmits any light having a color different from the light reflected by dichroic mirrors 141, 142 and 143. That is, dichroic mirrors 151, 152 and 153 transmit blue, red or green light and reflect any other light.

Because any light of a color reflected by the dichroic mirrors 141, 142 and 143 does not reach the second dichroic mirror disk 15, this color light can either be transmitted or be reflected. Regarding dichroic mirrors 151, 152 and 153, green light can either be transmitted or be reflected.

Dichroic mirrors 141, 142 and 143 of the first dichroic mirror disk 14 and dichroic mirrors 151, 152 and 153 of the second dichroic mirror disk 15 are in mutually corresponding positions. A white light beam from the collimator lens 13 passes through the transparent area 150 of the second dichroic mirror disk 15 and incident to dichroic mirrors 141, 142 and 143 of the first dichroic mirror disk 14. If an infrared reflection coating is applied to the transparent area 150, the DMD 1 may be prevented from overheating by infrared rays irradiated from the white light source 11.

The light transmitted through dichroic mirrors 141, 142 and 143 of the first dichroic mirror disk 14 is a light beam a, the light that is reflected by dichroic mirrors 141, 142 and 143 of the first dichroic mirror disk 14 and further reflected on the back of dichroic mirrors 151, 152 and 153 of the second dichroic mirror disk 15 is light beam b, and the light transmitted through dichroic mirrors 151, 152 and 153 of the second dichroic mirror disk 15 is a light beam c.

According to this configuration as shown in FIGS. 4 and 5, in the rotating dichroic mirror disk system 16, while dichroic mirror disks 14, 15 are rotated once by the spindle motor 17, the light beam a will change color in an order (sequence) of green-blue-red, the light beam b will change color in an order of red-green-blue, and the light beam c will change color in an order of blue-red-green. The timing of a color switch is detected by a photosensor 18 provided on the first dichroic mirror disk 14.

A white light beam passes through the transparent area 150 of the second dichroic mirror disk 15 and transmits through dichroic mirrors 141, 142 and 143 of the first dichroic mirror disk 14. The light beam a thus acquired is collected by a condenser lens 19 and enters into integrator 20, where it is converted into a slim rectangular image with uniform illumination. In a different aspect, the integrator 20 may be omitted. The image is collected by coupling lens 21, redirected by mirror 22, and then is irradiated on the DMD surface in an area A on the left side of the DMD 1 from a lower left front side.

A white light beam passes through a transparent area 150 of the second dichroic mirror disk 15 and is reflected on dichroic mirrors 141, 142 and 143 of the first dichroic mirror disk 14, and further reflected on the dichroic mirrors 151, 152 and 153 of the second dichroic mirror disk 15. The light beam c thus acquired is collected by a condenser lens 23, enters into integrator 24, and is converted by integrator 24 into a slim rectangular image with uniform illumination. As above, the integrator 24 may be omitted. The image is collected by coupling lens 25, redirected by mirror 26, and then is irradiated on the DMD surface in area C on the right side of the DMD 1 from a lower left front side.

A white light beam passes through a transparent area 150 of the second dichroic mirror disk 15 and is reflected on dichroic mirrors 141, 142 and 143 of the first dichroic mirror disk 14, and is further transmitted through dichroic mirrors 151, 152 and 153 of the second dichroic mirror disk 15. The light beam b thus acquired is reflected on mirror 27 and then collected by condenser lens 28, enters into integrator 29, and is converted by this integrator 29 at its output end into a slim rectangular image with uniform illumination. The image is collected by the coupling lens 30, redirected by the mirror 31, and then is irradiated on the DMD surface in area B in the center of the DMD 1 from a lower right front side. Again, in this aspect, integrator 29 can be omitted.

In this location, light shield 33 is inserted as required so that light beam a irradiating area A which is ⅓ on the left side of the DMD 1 will not overlap area C which is ⅓ on the right side of the DMD 1, or conversely, so that light beam c illuminating area C which is ⅓ on the right side of the DMD 1 will not overlap area A which is ⅓ on the left side of the DMD 1.

The optical system including the condenser lenses 19, 23 and 28, integrators 20, 24 and 29, coupling lenses 21, 25 and 30, and mirrors 22, 26, 27 and 31 provide an illumination light establishing unit.

The light entering into the DMD 1 is deflected toward projection lens 32, which is a projection unit (projector) when each micro mirror is in an ON state, and is projected on a screen via the projection lens 32.

In this configuration, the white light from white light source 11 is converted into a substantially parallel white light beam via an oval reflection mirror 12 and a collimator lens 13 and incident into rotating dichroic mirror disk system 16. In rotating dichroic mirror disk system 16, the white light beam passes through transparent area 150 of the second dichroic mirror disk 15 and is further transmitted through dichroic mirrors 141, 142 and 143 of the first dichroic mirror disk 14, and is converted into a light beam a in which color changes in an order of green-blue-red-green.

The white light beam passes through transparent area 150 of the second dichroic mirror disk 15 and is further reflected on dichroic mirrors 141, 142 and 143 of the first dichroic mirror disk 14 and dichroic mirrors 151, 152 and 153 of the second dichroic mirror disk 15, and is converted into light beam c in which color changes in an order of blue-red-green-blue.

The white light beam passes through transparent area 150 of the second dichroic mirror disk 15 and is reflected on dichroic mirrors 141, 142 and 143 of the first dichroic mirror disk 14 and is further transmitted through dichroic mirrors 151, 152 and 153 of the second dichroic mirror disk 15, and is converted into light beam b in which color changes in an order of red-green-blue-red.

Light beam a is collected by condenser lens 19 and is converted by integrator 20 into a slim rectangular image with a uniform illumination. The light beam a is further collected by coupling lens 21, redirected by mirror 22, and then is irradiated on the DMD surface in area A on the left side of the DMD 1 from a lower left front side.

Also, light beam c is collected by condenser lens 23 and is converted by integrator 24 into a slim rectangular image with a uniform illumination. The light beam c is further collected by coupling lens 25, redirected by mirror 26, and then is irradiated on the DMD surface in area C on the right side of the DMD 1 from a lower left front side.

Light beam b is reflected on mirror 27, collected by condenser lens 28 and is converted by integrator 29 into a slim rectangular image with a uniform illumination. The light beam b is further collected by coupling lens 30, redirected by mirror 31, and then is irradiated on the DMD surface in area B in the center of the DMD 1 from a lower right front side.

In DMD 1, each micro mirror in areas A and C inclines in a direction of lifting its upper right side in an ON state and inclines in a direction of lifting its lower left side in an OFF state. Further, each micro mirror in area B inclines in a direction of lifting its upper left side in an ON state and inclines in a direction of lifting its lower right side in an OFF state. Thus, reflections are redirected to projection lens 32 when each micro mirror is in an ON state in areas A, B and C and projection on the screen occurs via the projection lens 32.

Hence, the same illumination time as that of the conventional single-panel method is acquired by performing color sequential display using a single DMD 1. Further, grayscales can be controlled by using a simple PWM control since the illumination light colors switch all at once. Accordingly, grayscale levels of each of the three primary colors for each pixel are calculated from input signals, such as a TV signal and a computer image signal, and PWM control is exerted at an ON, OFF duty of each component of the DMD 1 in a period when the color of an illumination light beam matches that color. Thus, a color field is displayed and a full-color image can be displayed by switching the color field at high speed.

Moreover, a light beam a which illuminates area A in DMD 1 also illuminates an overlapping area B. The micro mirrors in area B incline in a direction of lifting their upper left side in an ON state and incline in a direction of lifting their lower right side in an OFF state, so the reflected light of the light beam a in area B is not reflected perpendicular to the DMD surface regardless of whether the micro mirror is ON or OFF. Thus, the reflected light is not projected on the screen through the projection lens 32.

Additionally, light beam c which illuminates an area C in the DMD 1 also illuminates an overlapping area B. The micro mirrors in area B incline in a direction of lifting their upper left side in an ON state and incline in a direction of lifting their lower right side in an OFF state, so in this case also, the reflected light of light beam c in area B is not reflected perpendicular to a DMD surface regardless of whether the micro mirror is ON or OFF. Thus, the reflected light is not projected on the screen through projection lens 32.

Furthermore, light beam b which illuminates an area B in a DMD 1 also illuminates overlapping area A, C. The micro mirrors in areas A, C incline in a direction of lifting their upper right side in an ON state and incline in a direction of lifting their lower left side in an OFF state. Therefore, in this case also, the reflected light of light beam b in area A, C is not reflected perpendicular to a DMD surface regardless of whether the micro mirror is ON or OFF, and the reflected light is not projected on the screen through the projection lens 32.

Thus, by using one DMD 1, as in the invention, and by dividing it into a plurality of areas, the reflection of overlapping illumination can be completely removed from the projection lens 32 so that an unclear color display due to the overlapping of an illumination light can be resolved, and a secure, integral color display can be implemented.

Moreover, while in the first preferred embodiment, a light beam is entered into areas A, C from a lower left front side, and each micro mirror is inclined in a direction of lifting its upper right side when in an ON state and is inclined in a direction of lifting its lower left side when in an OFF state, it is not necessarily limited to this. For example, regarding area C, the same working effect can be acquired if a light beam enters from an upper right side in the rear and each micro mirror is inclined in a direction of lifting its lower left side when in an ON state and is inclined in a direction of lifting its upper right side when in an OFF state.

Furthermore, while the exemplary DMD is divided into three areas (e.g., left, center and right) the DMD could be divided into top, center and bottom areas. In addition, areas of a DMD are not necessarily limited to three, but may also be separated into two areas or four or more areas.

Thus, the present invention provides a digital micro mirror device wherein at least two of the three primary colors separable from white light can be effectively used by illuminating each light beam into different areas and reflecting it. Further, illumination light overlapping adjacent areas does not adversely affect a projected image.

Also, the invention provides, in a color sequential display using a digital micro mirror device, a single-panel color projector that allows at least two of the three primary colors separable from white light to be effectively used at a low cost with high intensity, and is capable of securely displaying colors and easily controlling grayscales.

While the invention has been described in terms of preferred embodiments, those skilled in the art will recognize that the invention can be practiced with modification within the spirit and scope of the appended claims.

What is claimed is:

1. A digital micro mirror device, comprising:
   a reflection surface including an array of micro mirrors,
   wherein said reflection surface is divided into two or more areas,
   wherein an axis direction about which a micro mirror of said array of micro mirrors rotates in one area is the same for all of said micro mirrors in said area,
   wherein each mirror of said array of micro mirrors reflects light beams of multiple colors, and
   wherein an axis direction in an adjacent area about which a micro mirror of said array of micro mirrors rotates is different among said two or more areas.

2. The digital micro mirror device, as claimed in claim 1, wherein two or more light beams are illuminated to said two or more areas and are reflected therefrom.

3. A single-panel color projector, comprising:
   a white light source;
   a color separator for separating a white light from said white light source into two or more light beams;
   a digital micro mirror device having a reflection surface having an array of micro mirrors for reflecting said two or more light beams;
   an illumination light generator for illuminating said two or more light beams from said color separator; and
   a projector unit for collecting and projecting light reflected from said digital micro mirror device,
   wherein each mirror of said array of micro mirrors reflects light beams of multiple colors, and
   wherein said color separator separates said white light so that three primary light colors appear successively in each of said two or more light beams.

4. The projector, as claimed in claim 3, wherein a same color does not appear on a same timing in more than one of said two or more light beams.

5. The projector, as claimed in claim 3, wherein said reflection surface of said digital micro mirror device is divided into two or more areas.

6. A single-panel color projector, comprising:
   a white light source;
   a color separator for separating a white light from said white light source into two or more light beams;
   a digital micro mirror device having a reflection surface having an array of micro mirrors for reflecting said two or more light beams;
   an illumination light generator for illuminating said two or more light beams from said color separator; and
   a projector unit for collecting and projecting light reflected from said digital micro mirror device,
   wherein each mirror of said array of micro mirrors reflects light beams of multiple colors,
   wherein said reflection surface of said digital micro mirror device is divided into two or more areas, and
   wherein an axis direction about which a micro mirror of said array of micro mirrors rotates is different in an adjacent area among said two or more areas.

7. The projector, as claimed in claim 6, wherein said two or more beams are illuminated to said two or more areas correspondingly and are reflected therefrom.

8. The projector, as claimed in claim 3, wherein said illumination light generator produces an illumination light, said illumination light corresponding to an axis direction about which said array of micro mirrors on said reflection surface in two or more areas rotates.

9. The projector, as claimed in claim 3, wherein said projector unit collects said light reflected in a predetermined direction from said digital micro mirror device.

10. A single-panel color projector, comprising:
    a white light source;
    a color separator for separating a white light from said white light source into two or more light beams;
    a digital micro mirror device having a reflection surface having an array of micro mirrors for reflecting said two or more light beams;
    an illumination light generator for illuminating said two or more light beams from said color separator; and
    a projector unit for collecting and projecting light reflected from said digital micro mirror device,
    wherein said color separator separates a white light from said white light source into three light beams so that said three primary light colors appear successively in each beam and a same color does not appear on a same timing.

11. A single-panel color projector, comprising:

a white light source;

a color separator for separating a white light from said white light source into two or more light beams;

a digital micro mirror device having a reflection surface having an array of micro mirrors for reflecting said two or more light beams;

an illumination light generator for illuminating said two or more light beams from said color separator; and a projector unit for collecting and projecting light reflected from said digital micro mirror device, wherein each mirror of said array of micro mirrors reflects light beams of multiple colors, and wherein said reflection surface is divided into three areas and an axis direction about which a portion of said array of micro mirrors rotates is different in each area of said three areas.

12. A single-panel color projector, comprising:

a color separator for separating a white light into two or more light beams;

a digital micro mirror device having a reflection surface having an array of micro mirrors for reflecting said two or more light beams;

an illumination light generator for illuminating said two or more light beams from said color separator; and a projector unit for collecting and projecting light reflected from said digital micro mirror device, wherein each mirror of said array of micro mirrors reflects light beams of multiple colors, and wherein said color separator separates said white light so that three primary light colors appear successively in each of said two or more light beams.

13. The projector, as claimed in claim 12, wherein a same color does not appear on a same timing in more than one of said two or more light beams.

14. The projector, as claimed in claim 12, wherein said reflection surface of said digital micro mirror device is divided into two or more areas.

15. A single-panel color projector, comprising:

means for separating a white light into two or more light beams;

a digital micro mirror device having a reflection surface having an array of micro mirrors for reflecting said two or more light beams;

means for illuminating said two or more light beams from said separating means; and means for collecting and projecting light reflected from said digital micro mirror device, wherein each mirror of said array of micro mirrors reflects light beams of multiple colors, and wherein said separating means separates said white light so that three primary light colors appear successively in each of said two or more light beams.

16. The projector, as claimed in claim 15, wherein a same color does not appear on a same timing in more than one of said two or more light beams.

* * * * *